(12) United States Patent
Garrec

(10) Patent No.: US 7,574,939 B2
(45) Date of Patent: Aug. 18, 2009

(54) INTERMEDIATE SEGMENT OF AN ARTICULATED ARM COMPRISING A SCREW AND NUT TRANSMISSION

(75) Inventor: Philippe Garrec, Gif sur Yvette (FR)

(73) Assignee: Commissariat a l'Energie Atomique, Paris (FR)

( * ) Notice: Subject to any disclaimer, the term of this patent is extended or adjusted under 35 U.S.C. 154(b) by 638 days.

(21) Appl. No.: 10/549,049

(22) PCT Filed: Mar. 11, 2004

(86) PCT No.: PCT/FR2004/050102

§ 371 (c)(1),
(2), (4) Date: Sep. 12, 2005

(87) PCT Pub. No.: WO2004/082901

PCT Pub. Date: Sep. 30, 2004

(65) Prior Publication Data

US 2006/0169086 A1 Aug. 3, 2006

(30) Foreign Application Priority Data

Mar. 14, 2003 (FR) .................................. 03 50047

(51) Int. Cl.
*B25J 9/10* (2006.01)
(52) U.S. Cl. ................ 74/490.03; 74/89.34; 74/490.05; 901/25
(58) Field of Classification Search ................ 74/89.23, 74/89.34, 490.01, 490.03, 490.05; 901/23, 901/24, 25, 28
See application file for complete search history.

(56) References Cited

U.S. PATENT DOCUMENTS

| 4,697,472 A | 10/1987 | Hiyane |
| 5,271,292 A * | 12/1993 | Sawada et al. ........... 74/490.04 |
| 5,445,247 A * | 8/1995 | Sato .......................... 188/266 |
| 5,692,412 A * | 12/1997 | Rosheim .................. 74/490.05 |
| 5,937,699 A | 8/1999 | Garrec |
| 2003/0074990 A1 | 4/2003 | Garrec |

FOREIGN PATENT DOCUMENTS

| DE | 202 02 440 U | 2/2002 |
| FR | 2 640 607 | 12/1988 |
| FR | 2 807 959 | 10/2001 |
| JP | S62-157 788 | 7/1986 |
| JP | S62-192 486 | 8/1986 |
| JP | S62-188 690 | 8/1987 |

* cited by examiner

*Primary Examiner*—William C Joyce
(74) *Attorney, Agent, or Firm*—Nixon Peabody LLP

(57) ABSTRACT

An intermediate segment of a control or other arm, fitted with a transmission for supporting a following segment is made up of a motor which is displaced towards the other end of the segment, preferably beyond the joint to a previous segment in order to reduce the toppling moment on the segment. The transmission includes a movement conversion device using a screw and nut.

12 Claims, 4 Drawing Sheets

INTERMEDIATE SEGMENT OF AN ARTICULATED ARM COMPRISING A SCREW AND NUT TRANSMISSION

CROSS-REFERENCE TO RELATED APPLICATION

This application claims priority based on International Patent Application No. PCT/FR2004/050102, entitled "Intermediate Segment of an Articulated Arm Comprising a Screw and Nut Transmission " by Philippe Garrec, which claims priority of French Application No. 03 50047, filed on Mar. 14, 2003, and which was not published in English.

The subject of this invention is an intermediate segment which includes a nut and screw transmission, and also an arm in which such an intermediate segment is put to use.

Articulated arms used as control arms or as working arms are most commonly made up of several segments which are articulated together and which are supported by powered transmissions involving so-called force feedback motors which retain the joints and segments by preventing them from falling when they are no longer being operated. Of the transmissions that are known, some use a nut and screw system to convert the rotation of a motor shaft into the translation of a longilineal device, such as a cable, which drives the next segment of the arm. Such transmissions offer several advantages, including simplicity, adaptability to joints of different shapes and lengths, precision of movement due to the small amounts of play and lightness. French patent 2 809 464 illustrates such a transmission.

The motor is often found close to the nut, or integrated with screw-nut cylinder. The often preponderant weight of the motor results in a toppling moment and significant inertia in relation to the axes of the segment joints.

This invention proposes a modification of this usual type of design in which, through the addition of a transmission, the motor is brought closer to the joint axis of the preceding segment in order to reduce the inertia and to exert an appropriate low toppling moment, or even in order to contribute towards the equilibrium of the rest of the transmission or segment. It then becomes very easy to hold or move the segment, even when using a low-power motor.

In summary therefore, one aspect of the invention is an intermediate segment of the articulated arm, fitted to a preceding segment by a rotary joint and to which is fitted a following segment, including a transmission for holding the following segment, which is made up of a motor, a nut which rotates with the motor, a screw which is engaged in the nut and a connection device stretching between the screw and the following segment, characterised by the fact that the motor is connected to the nut by an extended motor shaft so that the motor is in a position which is close to the rotary joint axis. The motor shaft is in actual fact extended so that the motor is closer to the joint axis than the screw and the nut. The motor may therefore be placed in front of the joint, or beyond it, on the other side of the arm.

BRIEF DESCRIPTION OF DRAWINGS

The invention will now be described in association with the figures.

DETAILED DESCRIPTION

Figure 1:
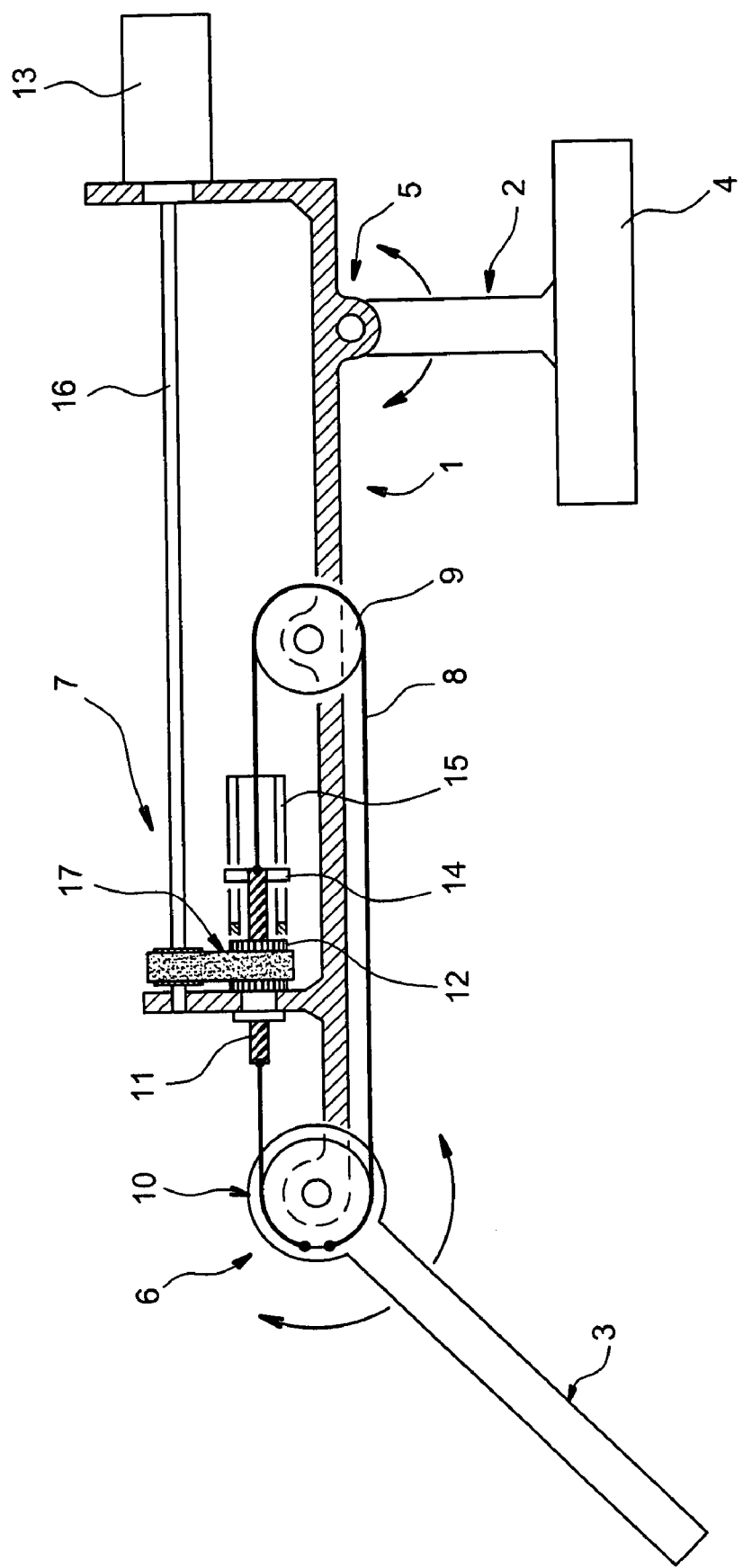
FIG. 1 represents one option for manufacture of the invention.

The portion of the arm represented in FIG. 1 by way of general explanation includes an intermediate segment 1 held at both ends by a preceding segment 2 and a following segment 3. The preceding segment 2 is closer to a base, 4, and is here fixed to it. It is connected to the intermediate segment 1 by an initial joint 5, and the following segment 3 is connected to the intermediate segment 1 by another joint 6. The following segment 3, which is further from the base 4 than intermediate segment 1 may or may not include the end of the arm. Joints 5 and 6 are rotary joints, as are commonly used in this technical area, but other connections between segments 1, 2 and 3 would be possible. Here is how joint 6 is controlled or maintained in a stopped position. A transmission 7 is housed in the intermediate segment 1. It is made up of a cable in the form of a loop, running between two pulleys 9 and 10, (the second of which actuates the joint 6), a screw 11 to which the cable 8 is attached, a nut 12 into which the screw 11 is engaged, and a motor 13. Rotation of the motor 13 causes the screw 12 to turn and moves the screw 11 and cable 8 forward, causing the pulley 10 to rotate. Cable 8 passes through the hollow screw 11, to which it is attached at a point. Cable 8 is also attached to pulley 10, and rotation of screw 11 is prevented by, for example, a roller trolley 14 fitted to screw 11 and which moves along a fixed slide 15.

The majority of the transmission 7, including the nut 12 and screw 11, are close to the second joint 6, and therefore exert a significant toppling moment on segment 1 around the first joint 5 in the area of the support provided by the base 4. To counteract this, however, it is now planned to locate motor 13 from the rest of the transmission 7 to be placed not far from the first joint 5 opposite the other joint 6, and in particular in front of it or even beyond it in relation to the screw 11 and nut 12. Thus the motor, which is usually the heaviest part of the transmission 7, no longer exerts a significant toppling moment; if it is beyond the first joint 5 it may even exert a toppling moment which balances that of the rest of the transmission 7 or of the intermediate segment 1.

A long transmission shaft 16 can then be appropriately added between the motor 13 and a mechanism 17, such as a gear drive, in order to transmit the motor rotation to the nut 12. The sub-transmission made up of elements 16 and 17 in itself adds weight to the intermediate segment 1, but only a moderate amount, and this will often be compensated for by the reduced weight of the motor 13 which could be achieved as a result of the reduction in the toppling moment that has to be balanced. It must also be remembered that the decrease in weight and reduction in toppling moment for a segment are advantageous not only for the design of the segment involved, but also for the segments that precede it, which will also have a smaller toppling moments applied to them. This will often enable the weight of their motors to be reduced, even if the invention is not applied to them. Finally, the reduction of these forces will also allow the weight of the structure of the segments themselves to be reduced.

Figure 2:
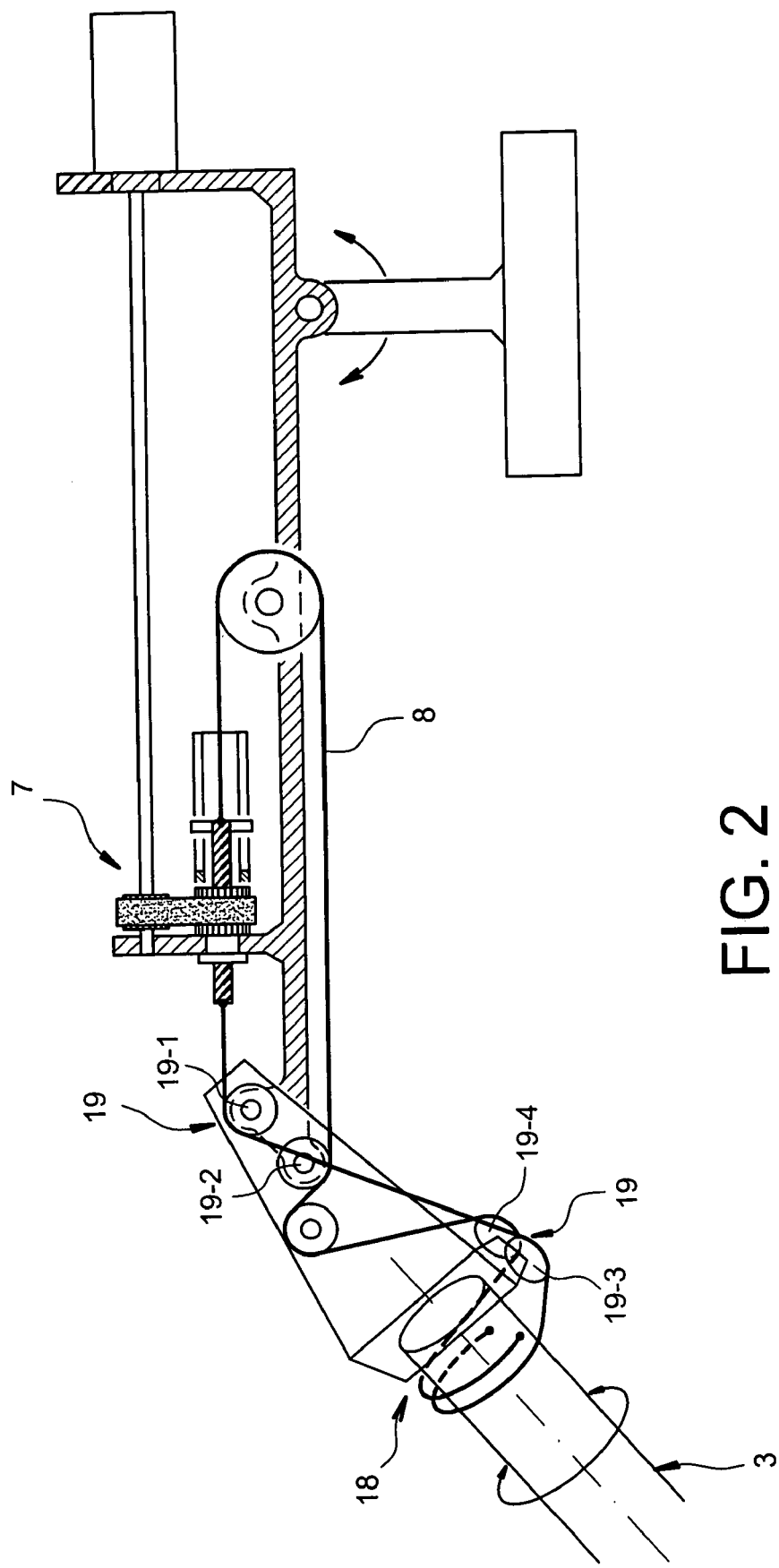
FIG. 2 represents a slightly different option for manufacture.

The device shown in FIG. 2 shows analogous components, although the transmission, still identified as 7, controls a second so-called rolling-motion joint 18 which makes the following segment 3 pivot, instead of a pitch motion joint as in FIG. 1. Cable 8 is then run in a slightly more complex manner over a set of pulleys 19 so that its end passes around the following segment 3. Pulleys 19-1 and 19-2 are concentric with the axis of joint in the following segment. Pulleys 19-3 and 19-4 provide a change of direction or constraint. The movement of the transmission 7 is here also accompanied by movement in cable 8 and causes the following segments 3 to rotate in relation to it. All the previous considerations for transmission 7 remain valid.

Figure 3:
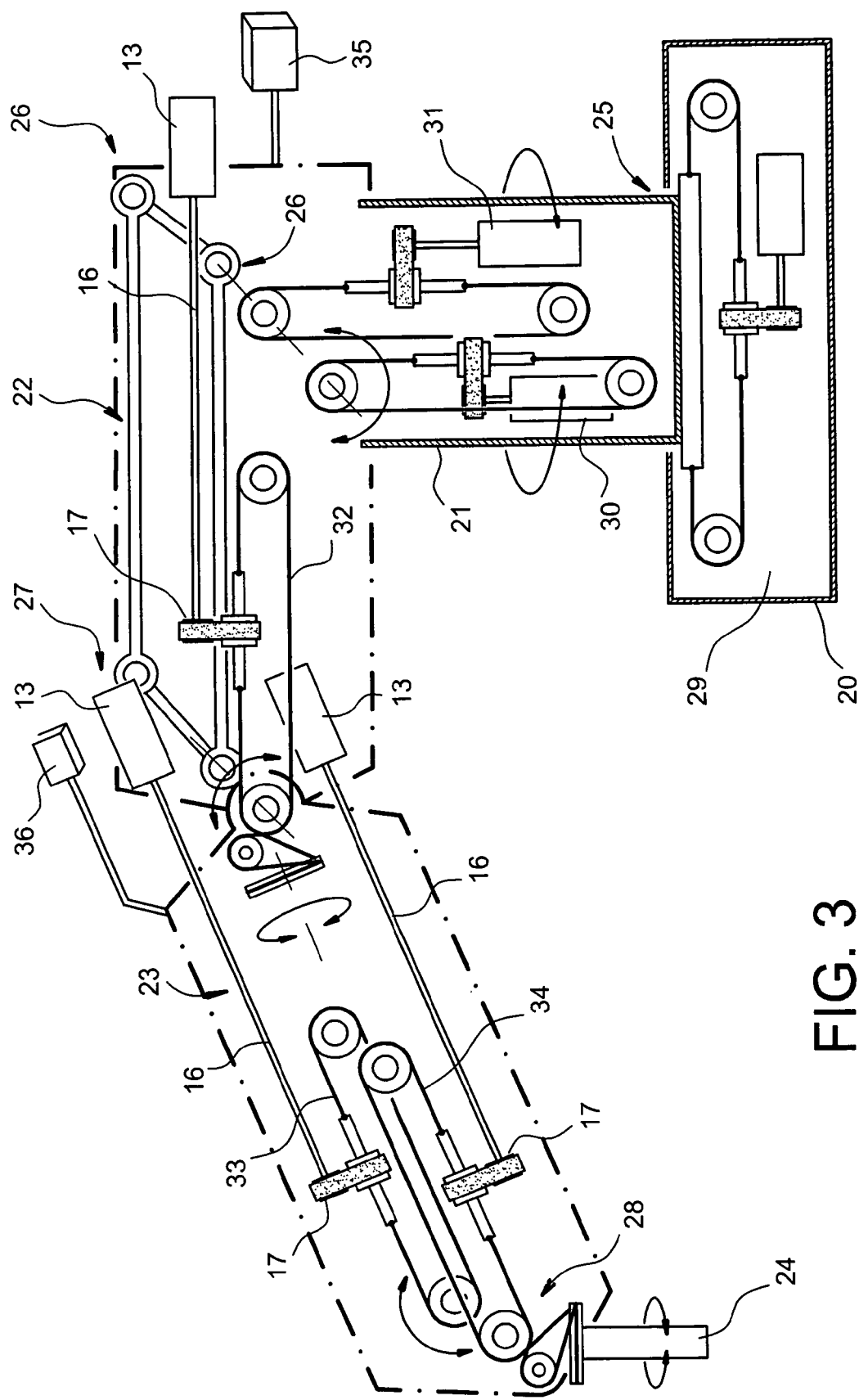
FIGS. 3 and 4 show two modes of manufacture for a control arm.

FIG. 3 shows a control arm equipped with the invention. It is made up of a base 20, a first segment 21 and second segment 22, a third segment 23 and a grip 24. The first segment is connected to the base 20 by means of a first joint (rolling-motion) 25, the second segment 22 is connected to the first segment 21 by a second joint (double pitch-motion) 26, the third segment is connected to the second segment 22 by a third joint (pitch-motion) 27, and the grip 24 is connected to the third segment 23 by a fourth joint (double pitch-and rolling-motion) 28. The second joint 26 is double, with the structure of the second segment 22 being in the form of a parallelogram: one degree of freedom causes the parallelogram to tip over, straightening the second segment 22, whilst another degree of freedom alters the height of the parallelogram, and tips the third segment 23 around the second pitch-motion joint 27. By this means a force feedback motor associated with the third joint 27 may be placed in the first segment 21, that is, at a position where it exerts no moment.

This arm with six degrees of freedom also includes six force feedback transmissions to stop all possible movements. These may all include nut and screw mechanisms, some of which are equipped with the invention. They bear references 29 to 34 and are located, respectively in the base 20 to control the rotation of the first segment 21, in the first segment 21 to control the pitch motion of the second segment 22 and that of the second segment 23, in the second segment 22, to control the rolling motion of the third segment 23, and in the third segment 23 to prevent the pitch motion and rolling motion of the grip 24.

There is no need to apply the invention to the first three transmissions 29, 30 and 31, the first of which is located in the fixed base 20 and the another two in the first segment 21 which is vertical and which pivots, so that they do not exert any toppling moment. The invention is, on the other hand, used to equip the other three transmissions 32, 33, and 34: the motor 13 in the fourth transmission 32 is located at the rear of the second segment 22, beyond the second joint 26 and the motors 13 of the fifth and sixth transmissions 33 and 34 are in a similar fashion located behind the third segment 23 and the third joint 27, near to the second segment 22. Transmission shafts 16 and mechanisms 17 for the transmission of movement to the nuts 12 are also shown. Three motors 13 have therefore been moved, making it possible to completely balancing at least the second segment 22, if necessary by adding a balancing weight 35 close to the motor 13 for the fourth transmission 32 (or even a spring): the moment which the motors in the second and third transmissions 30 and 31 must balance is thus greatly reduced, which allows their weight, and possibly that of the rest of the arm up to the base 20, to be reduced. The decrease in the inertia of the arm as a result of this weight reduction will be particularly beneficial for a manipulated arm. The cumulative character of the effects of the invention (which are more noticeable for arms made up of chains of segments) must be emphasised.

Figure 4:
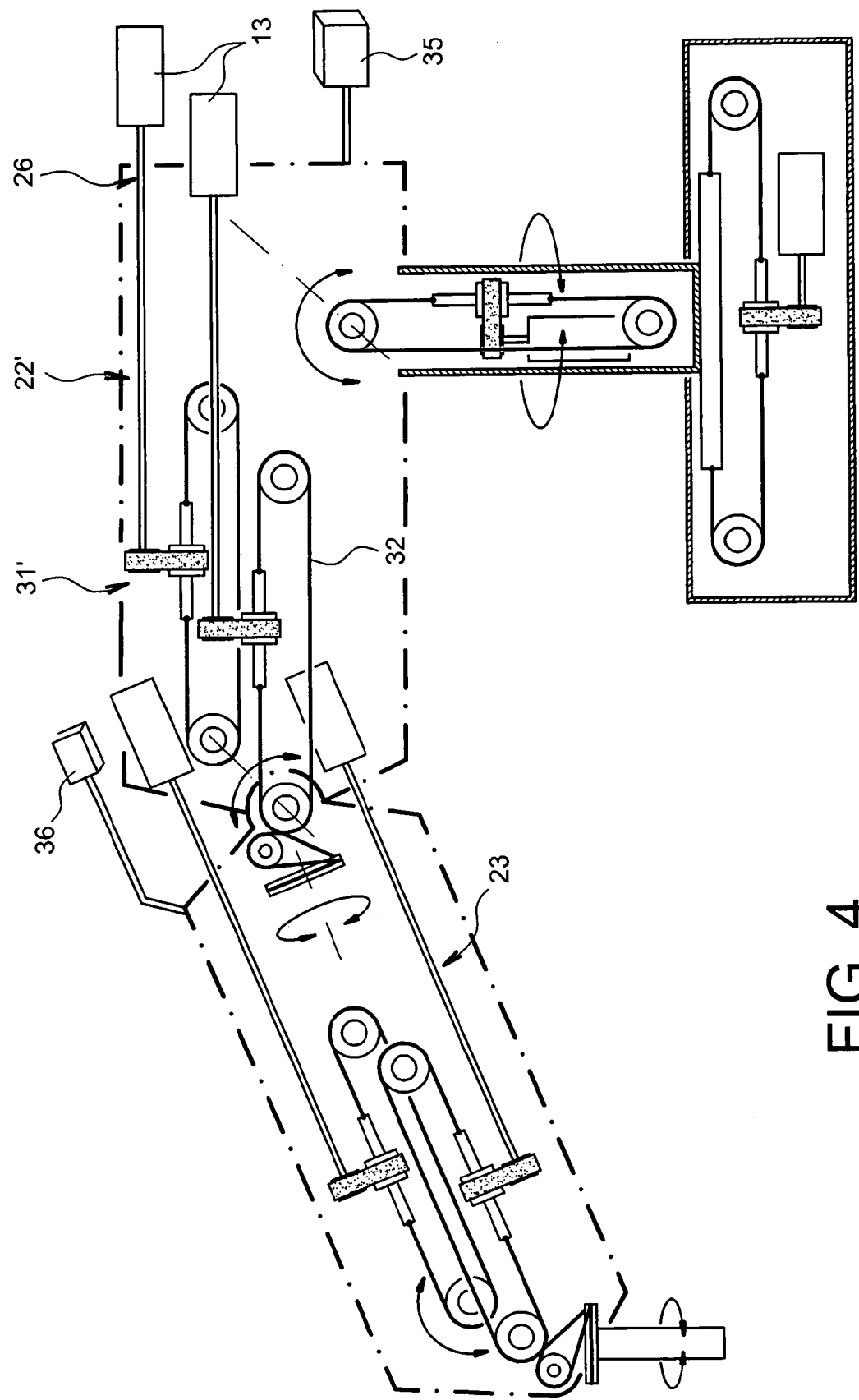

Certain variants of the arm remain possible which retain the properties of previous assemblies. It is already foreseen that the first transmission 29 could also be placed in the first segment 21. More significant changes can be described by referring to FIG. 4. These involve, in an arm that is otherwise little different from that in FIG. 3, the second segment, here referred to as 22', and with the third transmission 31' which is responsible for applying a rolling-pitching motion to the third segment 23.

This third transmission 31' is now located in the second segment 22', which no longer has a parallelogram structure, but which has a standard (tubular) linear structure. The third transmission 31' is constructed like the fourth 32 that is adjacent to it, with its motor 13 offset towards the rear of the second segment 22', beyond the second joint 26. Here also the arm is subjected to a low toppling moment. In this option for manufacture, as with the other, balancing of the third segment may be supplemented using a counterweight or a spring 36.

What is claimed is:

1. An articulated arm including a plurality of segments articulated together, the arm including an intermediate segment coupled to a preceding segment by a rotary joint at a first end and coupled to a following segment at a second end, the intermediate segment comprising:
   a motor;
   a motor shaft configured to be driven by the motor, wherein at least a portion of the motor shaft extends between the first and second ends; and
   a transmission configured to support the following segment with respect to the intermediate segment, the transmission including a rotating nut, a screw threaded in the nut and a connection device linking the screw to the following segment, the nut, the screw and the connection device located proximal to the second end and distal to the first end of the intermediate segment, wherein the motor is located proximal to the first end and distal to the second end of the intermediate segment.

2. An intermediate segment according to claim 1, further including a mechanism linking the motor shaft to the nut for transmitting a rotation of the motor shaft to the nut.

3. An intermediate segment according to the claim 1, wherein the motor extends beyond the rotary joint with respect to the nut and the screw.

4. An intermediate segment according to claim 1, wherein the transmission comprises a pair of pulleys, one of said pulleys embodying a rotary joint between the intermediate segment and the following segment, and a cable taut around the pulleys and tied to the screw.

5. An articulated arm made up of a first segment connected to a base, a second segment connected to the first segment, a third segment connected to the second segment and a fourth segment, connected to the third segment, wherein the second segment and the third segment are intermediate segments according to claim 1.

6. An intermediate segment according to the claim 1, wherein the intermediate segment has a first length distance from the first end to the second end, wherein the motor is located a second length distance from the first end, the second length distance being greater than the first length distance.

7. An intermediate segment according to the claim 1, wherein the motor shaft is oriented substantially parellel to the intermediate segment.

8. An articulated arm comprising:
   a first segment connected to a base;
   a second segment coupled to the first segment;
   a third segment coupled to the second segment; and
   a fourth segment coupled to the third segment,
   wherein at least one of the segments includes a first end pivotably coupled to a preceding segment and a second opposed end pivotably coupled to a following segment, the least one segment includes a first motor coupled to a first transmission via a first motor shaft and a second motor coupled to a second transmission via a second motor shaft to support the following segment, each transmission including a rotating nut, a screw threaded in the nut and a connection device linking the screw to the following segment, the first and second transmissions located adjacent to the second end by a double joint including a pivoting joint and a rotary joint, the first and second motors located adjacent to the first end.

9. An articulated arm according to claim 8, wherein the at least one segment is both the second segment and the third segment, and the first segment is connected to the second segment by a rotary joint and to the base by a pivoting joint.

10. An articulated arm according to claim 8, wherein the at least one segment is the third segment, the second segment having an articulated parallelogram structure, and the first segment includes a pair of motors and transmissions for respectively rotating the second segment and modifying a height of the parallelogram, the third segment being connected to the second segment and movement the third segment depending on the modified height of the parallelogram.

11. An articulated arm according to claim 8, wherein the second segment includes a third motor coupled to a third transmission configured to support the third segment with respect to the second segment, said third transmission including rotating nut, a screw threaded in the nut and a connection device linking the screw to the third segment, the third transmission located adjacent to a second end of the second segment which is connected to the third segment, the motor located adjacent to a first end of the second segment which is connected to the first segment, and the second segment further includes a motor shaft driven by the motor and which extends substantially from the first end to the second end, the third segment being connected to second segment also by a pivoting joint driven by said motor and said transmission.

12. An articulated arm according to claim 8, wherein the first and second transmissions are located proximal to the second end and distal to the first end, and the first and second motors are located proximal to the first end and distal to the second end.

* * * * *

UNITED STATES PATENT AND TRADEMARK OFFICE
CERTIFICATE OF CORRECTION

| | | |
|---|---|---|
| PATENT NO. | : 7,574,939 B2 | Page 1 of 1 |
| APPLICATION NO. | : 10/549049 | |
| DATED | : August 18, 2009 | |
| INVENTOR(S) | : Philippe Garrec | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 973 days.

Signed and Sealed this

Seventh Day of September, 2010

David J. Kappos
*Director of the United States Patent and Trademark Office*